(12) United States Patent
Downey

(10) Patent No.: US 7,661,916 B2
(45) Date of Patent: Feb. 16, 2010

(54) FASTENER ASSEMBLY

(76) Inventor: Gerald P. Downey, 40176 Spitz Dr., Sterling Hts., MI (US) 48313

( * ) Notice: Subject to any disclaimer, the term of this patent is extended or adjusted under 35 U.S.C. 154(b) by 664 days.

(21) Appl. No.: 10/579,688

(22) PCT Filed: Nov. 9, 2004

(86) PCT No.: PCT/US2004/037452

§ 371 (c)(1),
(2), (4) Date: May 18, 2006

(87) PCT Pub. No.: WO2005/052386

PCT Pub. Date: Jun. 9, 2005

(65) Prior Publication Data

US 2007/0104556 A1 May 10, 2007

(51) Int. Cl.
*F16B 39/00* (2006.01)
*F16B 23/00* (2006.01)
*F16B 35/04* (2006.01)
*F16B 19/00* (2006.01)

(52) U.S. Cl. .................. 411/354; 411/169; 411/402; 411/424

(58) Field of Classification Search ............. 411/354, 411/169, 402, 424
See application file for complete search history.

(56) References Cited

U.S. PATENT DOCUMENTS

| 3,006,443 | A | | 10/1961 | Siler |
| 5,580,201 | A | * | 12/1996 | Brilmyer ............... 411/354 |
| 6,302,416 | B1 | | 10/2001 | Schmack |
| 6,382,645 | B1 | | 5/2002 | Gravelle et al. |
| 7,101,132 | B2 | * | 9/2006 | Hofschneider ........... 411/368 |
| 7,125,026 | B2 | * | 10/2006 | Genick, II ............ 280/86.753 |
| 7,370,868 | B2 | * | 5/2008 | Genick, II ............ 280/86.753 |
| 2004/0090030 | A1 | | 5/2004 | Genick, II |
| 2005/0001397 | A1 | | 1/2005 | Genick, II |

FOREIGN PATENT DOCUMENTS

GB 2116279 A 9/1983

* cited by examiner

*Primary Examiner*—Victor Batson
*Assistant Examiner*—David C Reese

(57) ABSTRACT

A fastener assembly adapted for providing adjustment between at least two members. A bolt includes a head, a shank axially extending from the head, and a circumferentially uninterrupted threaded portion axially extending from the shank. A first cam washer is fixed against rotation to the shank of the bolt in a position that is adjacent with respect to the head of the bolt. A second cam washer is fixed against rotation to the shank of the bolt in a position that is adjacent with respect to the threaded portion of the bolt. A threaded portion of a nut is threaded to the threaded portion of the bolt, and a skirt portion of the nut displaces the second cam washer as the nut is torqued down on the bolt.

26 Claims, 3 Drawing Sheets

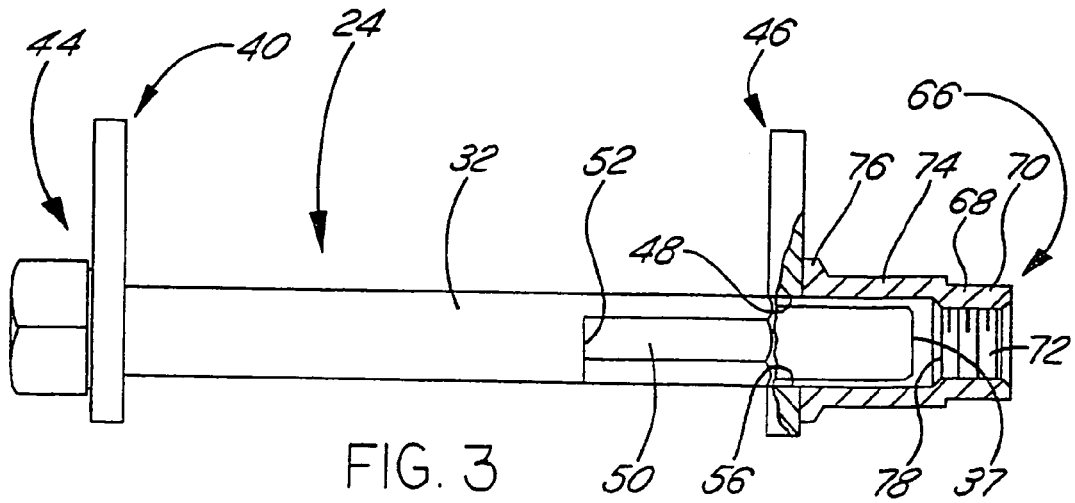
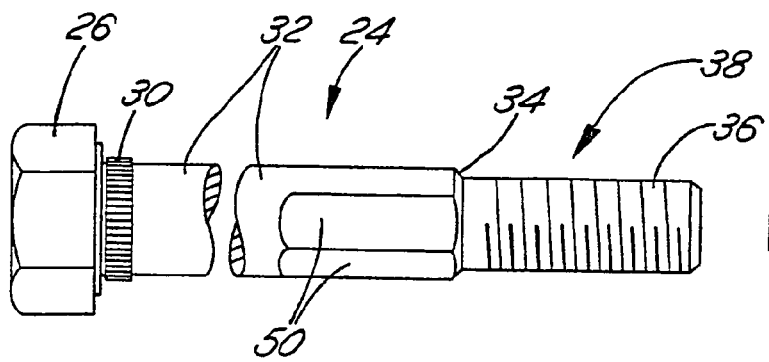
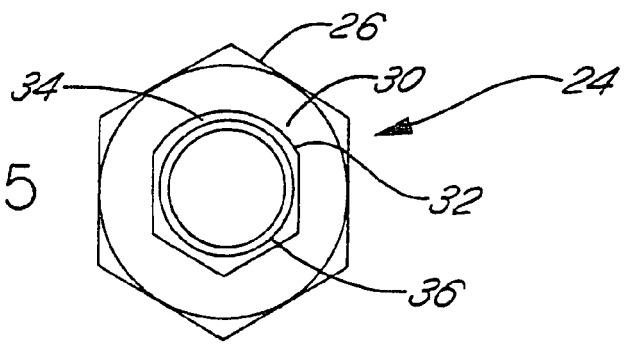
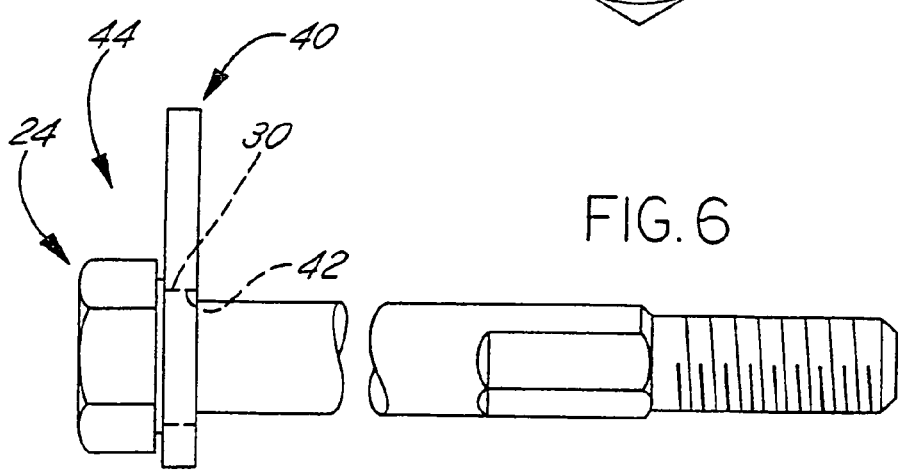

FASTENER ASSEMBLY

The present invention is directed to a fastener assembly, and more particularly to a cam bolt assembly for providing alignment adjustment between components such as automotive suspension components.

BACKGROUND AND SUMMARY OF THE INVENTION

Cam bolt assemblies are used as a means of controlled adjustment between a wide variety of adjustable components. For example, linkages in automotive suspension systems typically include cam bolt assemblies to provide adjustment between a shock absorber bracket and a suspension arm to effect tilting or camber adjustment of a wheel assembly attached to the suspension arm. In another example, cam bolt assemblies provide adjustment between a vehicle frame member and upper control arms to effect adjustment of camber and/or toe of a wheel assembly attached to the control arms. Cam bolt assemblies for suspension systems commonly include a bolt, a first cam washer fixed to the bolt just forward of a head of the bolt, a second cam washer engaged to a shank of the bolt over an engagement feature formed in the shank and in a threaded portion of the bolt, and a standard nut threadingly received on the threaded portion. The threaded portion of the bolt is provided with one or more locating features such as flats or grooves provided axially along the threaded portion for engaging the second cam washer. For example, the threaded portion may be created by thread rolling the bolt and then axially machining one or more flats or grooves, or by forming one or more flats or grooves into the shank before rolling or cutting the threads.

Unfortunately, however, this conventional design has several disadvantages. The locating feature in the threads may require an extra forming or machining operation, and removing a substantial axial portion of the threads to create the locating feature may compromise the integrity of the threads. An extra manufacturing operation tends to increase the piece cost of the cam bolt assembly due to extra tooling costs and longer process cycle time. More importantly, however, the locating feature yields a reduced clamp load and proof load of the threaded connection between the bolt and the nut. In other words, as modified by the locating feature, the nut cannot be tightened down on the bolt to the full load specification for the type and size of the nut and bolt. To compensate for the reduced load carrying capability of the threaded connection, it is customary to provide an otherwise "oversized" nut and bolt combination having the locating feature, wherein the combination meets the clamp and proof loads of a smaller nut and bolt combination not having the thread interruption. In other words, it is necessary to provide an overall larger fastener assembly than would be otherwise required if the threads were not interrupted with the locating feature. This increase in fastener size yields an attendant increase in material costs and weight of the fastener assembly.

A fastener assembly adapted for providing adjustment between at least two members is provided in accordance with one aspect of the invention. The fastener assembly includes a bolt having a head, a shank axially extending from the head, and a circumferentially uninterrupted threaded portion axially extending from the shank. A first cam washer is fixed against rotation to the shank of the bolt in a position that is adjacent with respect to the head of the bolt. A second cam washer is fixed against rotation to the shank of the bolt in a position that is adjacent with respect to the threaded portion of the bolt.

In accordance with a second aspect of the invention, there is provided a cam bolt assembly that is adapted for providing adjustment between at least two members of an automotive suspension linkage. The cam bolt assembly includes a bolt having a head, an enlarged diameter portion axially adjacent to the head, a shank extending axially from the enlarged diameter portion, and a substantially uninterrupted threaded portion extending axially from the shank, wherein the shank has at least one key feature. A first cam washer is mounted to the enlarged diameter portion of the bolt. A second cam washer has an aperture therethrough that substantially corresponds in shape to the at least one key feature of said shank and is mounted to the shank of the bolt in engagement with the at least one key feature. A nut is adapted for attachment to the threaded portion of the bolt.

In accordance with a third aspect of the present invention, there is provided an automotive suspension linkage including a first member, a second member linked to the first member, and a cam bolt assembly linking the first and second members together. The cam bolt assembly includes a bolt having a head, an enlarged diameter portion axially adjacent to the head, a shank extending axially from the enlarged diameter portion, and a substantially uninterrupted threaded portion extending axially from the shank, wherein the shank has at least one key feature. A first cam washer is mounted to the enlarged diameter portion of the bolt. A second cam washer has an aperture therethrough that substantially corresponds in shape to the at least one key feature of said shank and is mounted to the shank of the bolt in engagement with the at least one key feature. A nut is adapted for attachment to the threaded portion of the bolt.

BRIEF DESCRIPTION OF THE DRAWINGS

The invention, together with additional objects, features, advantages and aspects thereof, will be best understood from the following description, the appended claims and the accompanying drawings, in which:

FIG. 3 is a partial cross-sectional view of a nut and second cam washer being assembled to a bolt and cam washer to establish the cam bolt assembly of FIG. 2;

FIG. 4 is partitioned view of the bolt of FIGS. 1-4;

FIG. 5 is an enlarged end view of the bolt of FIG. 4;

FIG. 6 is a partitioned view of the bolt and cam washer of FIG. 3;

DETAILED DESCRIPTION OF PREFERRED EMBODIMENTS

Figure 1:
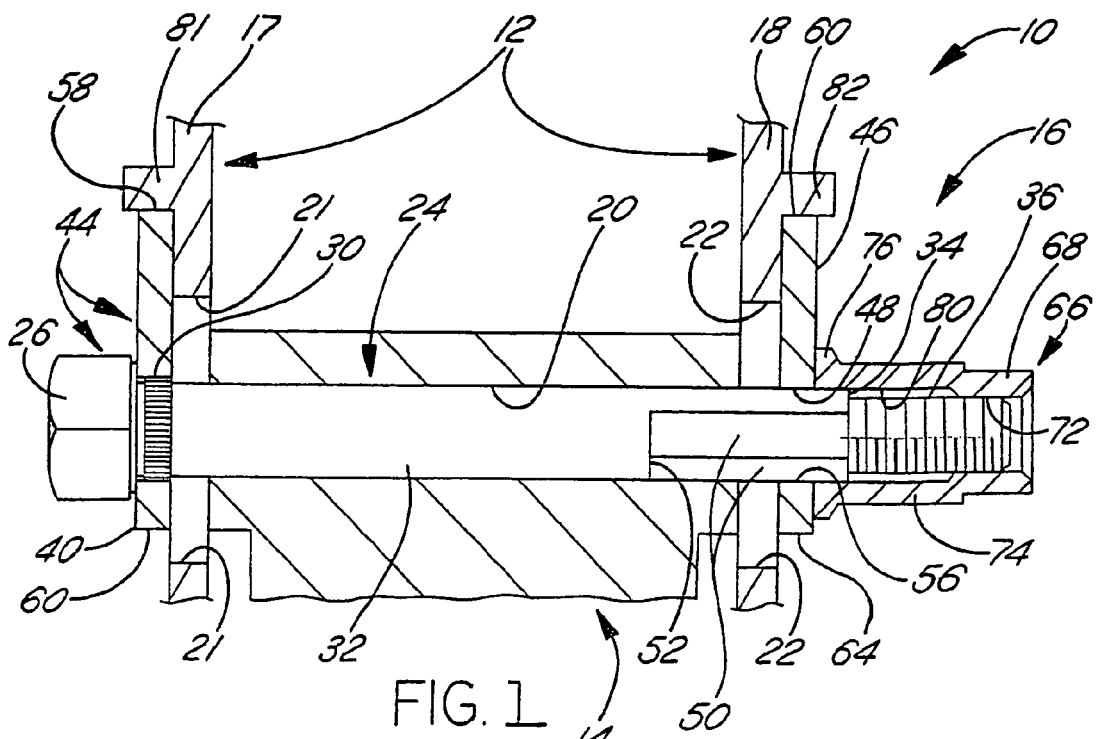
FIG. 1 is a partial cross-sectional view of a suspension linkage including a cam bolt assembly connecting two members that are adjustable with respect to one another, in accordance with an exemplary embodiment of the present invention.

FIG. 1 illustrates a partial cross-sectional view of a suspension linkage 10 including a first member 12 linked to a second member 14 by a cam bolt assembly 16. For example, the second member 14 may be a wheel assembly arm or bracket and the first member may be a shock absorber bracket or a vehicle frame member. In any case, the second member 14 is positioned between opposed flanges 17, 18 of the first member 12 and the cam bolt assembly 16 substantially extends through an aperture 20 of the second member 14 and through slots 21, 22 in the flanges 17, 18 of the first member 12.

Figure 2:
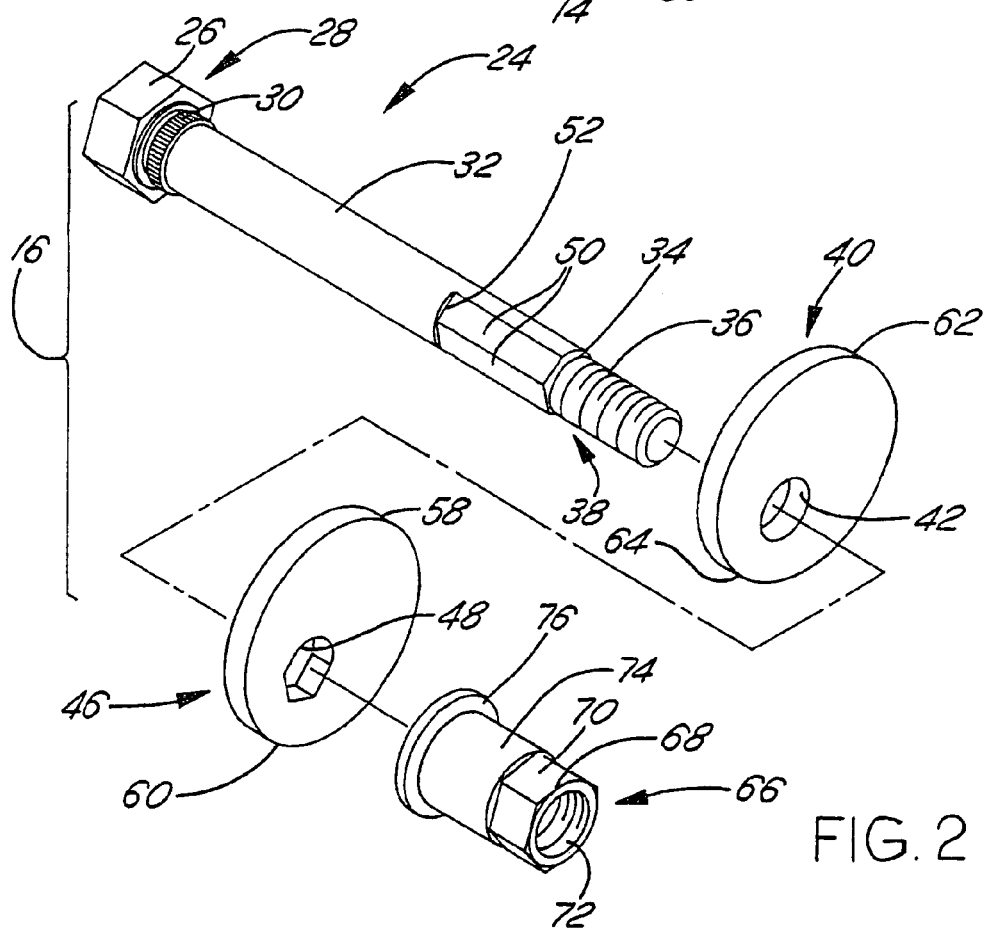
FIG. 2 is an exploded perspective view of the cam bolt assembly of the suspension linkage of FIG. 1.

FIG. 2 depicts the cam bolt assembly 16 in exploded perspective view. The cam bolt assembly 16 includes a bolt 24 having certain modifications according to an embodiment of the present invention. As also shown in FIGS. 4 and 5, the bolt 24 includes a hex head 26 at a rear end 28, an enlarged diameter 30 axially adjacent and forward of the hex head 26 on a shank 32 of the bolt, the shank 32 extending forward from the enlarged diameter 30 and axially terminating in a shoulder 34, and a threaded portion 36 forwardly extending from the shank 32. The threaded portion 36 is preferably of a smaller diametrical size than that of the shank 32, but may be substantially the same size. In specific contrast to prior art designs, the threaded portion 36 is not interrupted with an axially extending engagement feature. In other words, the threaded portion 36 is circumferentially uninterrupted over substantially the entire length thereof. As defined herein, the enlarged diameter portion 30 is an engagement feature that may be knurled or splined as shown, straight-sided, provided with one or more flats, or the like.

In FIG. 2, the cam bolt assembly 16 further includes a first cam washer 40 having an aperture 42 therethrough to accommodate assembly of the first cam washer 40 over the threaded portion 36 and shank 32 of the bolt 24. As best shown in FIG. 6, the first cam washer 40 mounts adjacent the bolt head 26 to the enlarged diameter 30 of the bolt 24 to define a bolt and cam assembly 44. As defined herein, adjacent encompasses immediate adjacency between the bolt head 26 and first cam washer 40, and where there is axial space between the bolt head 26 and the first cam washer 40. When the first cam washer 40 is assembled to the bolt 24, the splined enlarged diameter 30 of the bolt 24 acts as a self-broaching spline to broach the aperture 42 of the first cam washer 40. Thus, the first cam washer 40 is fixed to the bolt 24 against relative rotation therebetween and is substantially fixed against relative axial displacement therebetween. Referring again to FIG. 1, the bolt and cam assembly 44 is assembled to the rest of the vehicle suspension linkage 10 by inserting the bolt 24 through the slots 21, 22 and aperture 20 of the first and second members 12 and 14 until the first cam washer 40 abuts one of the flanges 17 of the first member 12 as shown.

Referring again to FIG. 2, a second cam washer 46 including an aperture 48 therethrough, is assembled freely over the threaded portion 36 of the bolt 24 past the shoulder 34 and onto a keyed portion of the shank 32 that is adjacent the threaded portion 36 and that is defined by one or more key features 50 that extend axially from the shoulder 34 to a hilt 52 of the shank 32. A forward end 38 of the bolt is defined starting with the hilt 52 and extending forward over the threaded portion 36. The rear end 28 of the bolt is defined starting with the enlarged diameter portion 30, to which the first cam washer 40 is mounted, and extending rearward over the head 26 of the bolt 24. The key features 50 as shown are four flats that comprise an incomplete hexagon, but the key features 50 could also be one or more contours, lobes, facets, splines, grooves, keyways, projections, or the like, and may be symmetric or asymmetric. The key features 50 are preferably integrally formed into the shank 32 of the bolt 24 during the manufacturing process of the bolt, such as cold forming.

Figure 7:
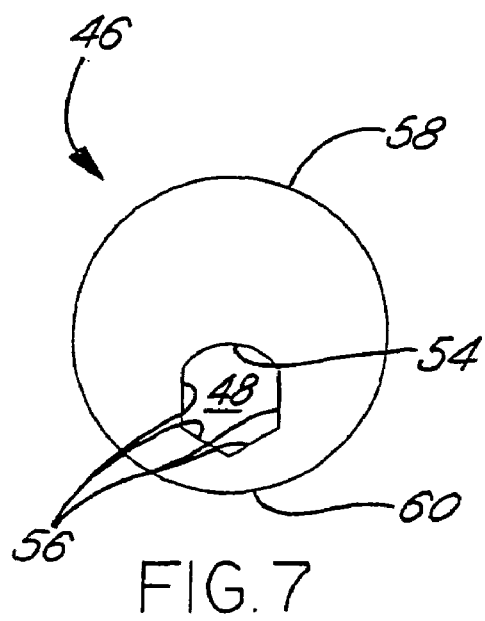
FIG. 7 is a front end view of the cam washer of FIG. 3.

The second cam washer 46 is individually illustrated in FIG. 7, which shows exemplary geometry of the aperture 48 that corresponds in kind to the key features of the bolt (not shown). The aperture 48 includes a diametrical portion 54, and a key feature or portion including four flats 56 that intersect with one another to define points that are substantially on the same diameter as the diametrical portion 54. In other words, the key feature of the second cam washer 46 appears as an incomplete hexagon. Like that of the bolt (not shown), the key feature(s) of the second cam washer 46 are preferably symmetrical so that either face of the second cam washer 46 may be assembled to the bolt (not shown), without adversely affecting the orientation of the second cam washer 46 with respect to the first (not shown). The key features 50 and the aperture 48 preferably are such that washer 46 assembles to bolt 24 in only one angular orientation between the washer and bolt. The aperture 48 is formed through the second cam washer 46 and is offset from the center thereof. Thus, when the second cam washer 46 is rotated about an axis defined substantially by the aperture 48, the second cam washer 46 operates as an eccentric or cam having a major lobe 58 and a minor lobe 60.

Figure 8:
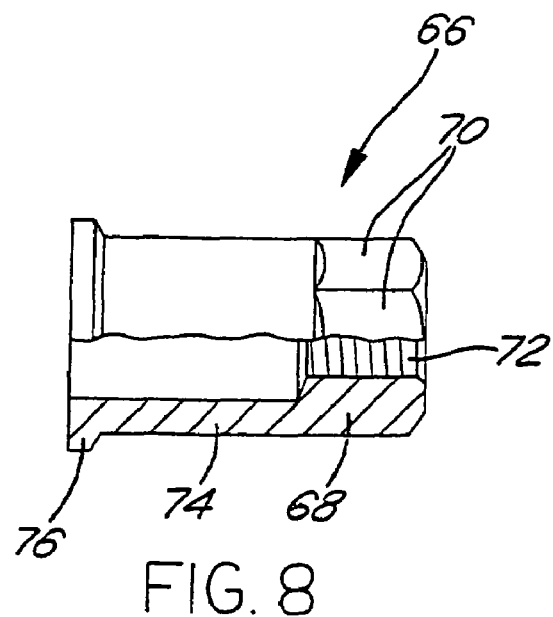
FIG. 8 is a plan view of the nut of FIG. 3.

Referring back to FIG. 2, the first cam washer 40 likewise-operates as an eccentric or cam and includes a major lobe 62 and a minor lobe 64 that are substantially in corresponding alignment with the major and minor lobes 58 and 60 of the second cam washer 46 when both are assembled to the bolt 24. Referring also to a partial cross-sectional view in FIG. 3, a nut 66 and the second cam washer 46 are being assembled to the pre-established bolt and cam assembly 44 consisting of the bolt 24 and first cam washer 40. As also shown in the partial cross section of FIG. 8, the nut 66 includes a threaded-portion 68 having external flats 70 and internal threads 72. The nut 66 also includes a cylindrical skirt portion 74 that depends axially away from the threaded portion 68 and terminates in a flange 76. As defined herein, skirt portion may include a circumferentially continuous portion as shown, but may also include an interrupted skirt, projections, prongs, or the like.

Referring to FIGS. 2 and 3, the assembly of the nut 66 and second cam washer 46 is error-proofed, wherein the nut 66 cannot threadingly engage the bolt 24 until the second cam washer 46 is substantially engaged to the shank 32 of the bolt 24. To error-proof the assembly, the skirt 74 of the nut 66 has a length equal to the length of the threaded portion 36 of the bolt 24 minus the thickness of the second cam washer 46, plus two times the thread pitch of the threaded portion 36 of the bolt 24. More specifically, before the nut 66 threads to the bolt 24, the flats 56 of the second cam washer 46 should correspondingly align with the flats or key features 50 of the bolt shank 32 and the second cam washer 46 should be at least partially assembled onto the shank 32. As broadly defined herein, the terminology "key feature" is any type of shape, formation, or the like that is capable of locating or orienting one member to another, and/or fixing one member to another against relative rotation therebetween. Similarly, the corresponding key features or flats 56 of the second cam washer 46 should correspond in kind to the type of key feature chosen for the bolt 24. In any case, the error-proof design is evidenced best in FIG. 3 by the gap between a forward end 37 of the threaded portion 36 of the bolt 32 and a start 78 of the threads 72 on the nut 66, while the second cam washer 46 is not yet assembled over the key features 50 on the shank 32 of the bolt 24. Accordingly, the nut 66 is prevented from jamming the cam washer 46 against the shoulder 34 of the bolt shank 32.

Referring again to FIG. 1, the second cam washer 46 and the nut 66 are assembled to the bolt 24, such that the flats 56 of the second cam washer 46 engage the key features 50 of the shank 32 of the bolt 24 and such that the threads 72 of the threaded portion 68 of the nut 66 threadingly engage the threaded portion 36 of the bolt 24. The second cam washer 46 is thus located adjacent the threaded portion 36 of the bolt. As defined herein, adjacent encompasses immediate adjacency between the second cam washer and the threaded portion 36, and where there is axial space between the second cam washer 46 and the threaded portion 36. The nut 66 is rotated on the bolt 24 such that the skirt 74 and its terminal flange 76 axially displace the second cam washer 46 flat against the flange 18 of the first member 12, and an internal diameter 80 of the skirt 74 passes freely over the shank 32 near the shoulder 34 thereof. As shown, the key features 50 on the shank 32 of the bolt 24 are provided in a length that can accommodate a variety of widths of members to be linked.

To adjust the distance between the members 12, 14 of the linkage 10, the bolt 24 is rotated to effect simultaneous rotation of the cam washers 40, 46. The cam washers 40, 46 bear against reaction tabs 81, 82 that extend perpendicularly from the flanges 17, 18 of the first member 12. As shown, the major lobes 58, 62 of the cam washers 40, 46 bear against the tabs 81, 82 for a maximum adjustment distance between the first and second members 12, 14. To the extent defined by the slots 21, 22 in the flanges 17, 18 of the first member 12, the linkage 10 may be adjusted anywhere between this maximum distance and a minimum distance, which is established when the cam washers 40, 46 are rotated such that the minor lobes 60, 64 bear against the tabs 81, 82. Once the desired adjustment between the members 12, 14 is complete, the nut 66 is then torqued down on the bolt 24 tightly against the second cam washer 46 to fix the linkage 10 in place.

In conclusion, the present invention provides a cam bolt assembly having a bolt with a threaded portion whose thread integrity is not compromised by engagement feature interruptions therethrough. Rather, the engagement feature is provided on an adjacent shank portion of the bolt away from the threaded portion. Also, the manufacture of the bolt does not require a separate manufacturing operation to create the engagement feature through the threaded portion and, in fact, the engagement feature is formed on the shank simultaneously with the rest of the features of the bolt in any suitable bolt forming process. Thus, the present invention yields a reduction in manufacturing complexity and costs. Furthermore, a nut can be torqued down on the bolt to the full published specification for the type and size of fastener selected. In other words, in contrast to prior art designs, it is not necessary to "oversize" the nut and bolt to compensate for a loss in thread interengagement therebetween due to interrupted bolt threads. Therefore, a relatively smaller nut and bolt can be used, thereby saving on material costs and weight. Finally, the present invention includes an error-proof assembly of a nut and second cam washer combination, wherein it is impossible to mislocate and jam the second cam washer on the bolt between the nut and the bolt shank.

There have thus been described a fastener assembly apparatus that fully satisfies all of the objects and aims previously set forth. The present invention has been disclosed in conjunction with presently preferred embodiments thereof, and a number of modifications and variations have been discussed. Other modifications and variations will readily suggest themselves to persons of ordinary skill in the art in view of the foregoing description. For example, the invention has been disclosed in conjunction with a vehicle suspension system, but other implementations are contemplated. Directional words such as top, bottom, upper, lower, radial, circumferential, and the like are employed by way of description and not limitation. Indeed, the invention is intended to embrace all modifications and variations as fall within the spirit and broad scope of the appended claims.

The invention claimed is:

1. A fastener assembly adapted for providing adjustment between at least two members, said fastener assembly including:
   a bolt having a head, a shank axially extending from said head, and a circumferentially uninterrupted threaded portion axially extending from said shank;
   a first cam washer fixed against rotation to said shank of said bolt adjacent said head of said bolt; and
   a second cam washer fixed against rotation to said shank of said bolt adjacent said threaded portion of said bolt,
   said shank of said bolt including at least one key feature, and said second cam washer including an aperture adapted for freely passing over said threaded portion of said bolt and further including at least one key feature corresponding to said at least one key feature of said bolt, thereby fixing said second cam washer to said shank of said bolt against rotation with respect thereto,
   said at least one key feature of said bolt being integrally formed into said shank of said bolt during production of said bolt,
   said at least one key feature of said bolt including at least two adjacent flats and said aperture of said second cam washer being defined by at least two corresponding adjacent flats, said at least two adjacent flats on said bolt and said at least two adjacent flats on said cam washer forming incomplete hexagons in cross section.

2. The fastener assembly set forth in claim 1 further including a nut adapted for attachment to said threaded portion of said bolt.

3. The fastener assembly set forth in claim 2 wherein said nut includes a threaded portion and a skirt portion extending from said threaded portion, said threaded portion adapted for threading to said threaded portion of said bolt after said second cam washer is at least partially fixed to said shank, thereby preventing the possibility of said second cam washer becoming misassembled to said bolt between said shank and said nut.

4. The fastener assembly set forth in claim 3 wherein said skirt portion of said nut has a length equal to the length of said threaded portion of said bolt minus the thickness of said second cam washer, plus two times the thread pitch of said threaded portion of said bolt.

5. The fastener assembly set forth in claim 1 wherein said threaded portion of said bolt is circumferentially uninterrupted over substantially the entire length of said threaded portion.

6. The fastener assembly set forth in claim 5 wherein said threaded portion does not include any axially-extending circumferential interruptions.

7. The fastener assembly set forth in claim 1 wherein each said incomplete hexagon in cross section includes four of six sides.

8. The fastener assembly set forth in claim 1 wherein said at least one key feature of said bolt extends axially from said threaded portion for a length adapted to accommodate a variety of widths of said at least two members.

9. The fastener assembly set forth in claim 1 wherein said threaded portion of said bolt is diametrically smaller than said shank of said bolt to facilitate said second cam washer to pass freely thereover and engage said at least one key feature of said shank.

10. The fastener assembly set forth in claim 1 wherein said first cam washer is splined to said bolt.

11. A cam bolt assembly adapted for providing adjustment between at least two members of an automotive suspension linkage, said cam bolt assembly including:

a bolt having a head, an enlarged diameter portion axially adjacent said head, a shank extending axially from said enlarged diameter portion, and a substantially uninterrupted threaded portion extending axially from said shank, said shank having at least one key feature;

a first cam washer mounted to said enlarged diameter portion of said bolt;

a second cam washer mounted to said shank of said bolt in engagement with said at least one key feature, said second cam washer having an aperture therethrough that substantially corresponds in shape to said at least one key feature of said shank; and a nut adapted for attachment to said threaded portion of said bolt, said nut including a threaded portion and a skirt portion extending from said threaded portion, said threaded portion being adapted for threading to said threaded portion of said bolt after said second cam washer is at least partially engaged with said at least one key feature, thereby preventing the possibility of said second cam washer becoming misassembled to said bolt between said shank and said nut, said at least one key feature of said bolt being integrally formed into said shank of said bolt during cold forming of said bolt, said at least one key feature of said bolt including at least two adjacent flats and said aperture of said second cam washer being defined by at least two corresponding adjacent flats, said at least two adjacent flats on said bolt and said at least two adjacent flats on said cam washer forming incomplete hexagons in cross section.

12. The cam bolt assembly set forth in claim 11 wherein said at least one key feature on said bolt and said aperture in said second cam washer are such that said second cam washer can be assembled to said bolt at only one angular orientation of said second cam washer to said bolt.

13. The cam bolt assembly set forth in claim 12 wherein said skirt portion of said nut has a length equal to the length of said threaded portion of said bolt minus the thickness of said second cam washer, plus two times the thread pitch of said threaded portion of said bolt.

14. The cam bolt assembly set forth in claim 11 wherein said threaded portion of said bolt is circumferentially uninterrupted over substantially the entire length of said threaded portion.

15. The cam bolt assembly set forth in claim 14 wherein said threaded portion does not include any axially-extending circumferential interruptions such as grooves or flats.

16. The cam bolt assembly set forth in claim 11 wherein said incomplete hexagon in cross section includes four of six sides.

17. The cam bolt assembly set forth in claim 11 wherein said at least one key feature of said bolt extends axially from said threaded portion for a length adapted to accommodate a variety of widths of said at least two members.

18. The cam bolt assembly set forth in claim 11 wherein said threaded portion of said bolt is diametrically smaller than said shank of said bolt to facilitate said second cam washer to pass freely thereover and engage said at least one key feature of said shank.

19. An automotive suspension linkage including:
a first member;
a second member linked to said first member; and
a cam bolt assembly linking said first and second members, said cam bolt assembly including:

a bolt having a head, an enlarged diameter portion axially adjacent said head, a shank extending axially from said enlarged diameter portion, and a substantially uninterrupted threaded portion extending axially from said shank, said shank having at least one key feature;

a first cam washer mounted to said enlarged diameter portion of said bolt;

a second cam washer mounted to said shank of said bolt in engagement with said at least one key feature, said second cam washer having an aperture therethrough that substantially corresponds in shape to said at least one key feature of said shank; and a nut adapted for attachment to said threaded portion of said bolt, said at least one key feature of said bolt being integrally formed into said shank of said bolt during cold forming of said bolt, said at least one key feature of said bolt including at least two adjacent flats and said aperture of said second cam washer being defined by at least two corresponding adjacent flats, said at least two adjacent flats on said bolt and said at least two adjacent flats on said cam washer forming incomplete hexagons in cross section.

20. The automotive suspension linkage set forth in claim 19 wherein said nut includes a threaded portion and a skirt portion extending from said threaded portion, said threaded portion adapted for threading to said threaded portion of said bolt after said second cam washer is at least partially engaged with said at least one key feature, thereby preventing the possibility of said second cam washer becoming misassembled to said bolt between said shank and said nut.

21. The automotive suspension linkage set forth in claim 20 wherein said skirt portion of said nut has a length equal to the length of said threaded portion of said bolt minus the thickness of said second cam washer, plus two times the thread pitch of said threaded portion of said bolt.

22. The automotive suspension linkage set forth in claim 19 wherein said threaded portion of said bolt is circumferentially uninterrupted over substantially the entire length of said threaded portion.

23. The automotive suspension linkage set forth in claim 22 wherein said threaded portion does not include any axially-extending circumferential interruptions such as grooves, or flats.

24. The automotive suspension linkage set forth in claim 19 wherein said incomplete hexagon in cross section includes four of six sides.

25. The automotive suspension linkage set forth in claim 19 wherein said at least one key feature of said bolt extends axially from said threaded portion for a length adapted to accommodate a variety of widths of said first and second members.

26. The automotive suspension linkage set forth in claim 19 wherein said threaded portion of said bolt is diametrically smaller than said shank of said bolt to facilitate said second cam washer to pass freely thereover and engage said at least one key feature of said shank.

* * * * *